Nov. 13, 1956         F. RITTER        2,770,566
METHOD OF BONDING A POLYAMIDE LAYER TO A POLYVINYL
CHLORIDE LAYER AND PRODUCTS THUS OBTAINED
Filed Sept. 24, 1952

United States Patent Office 2,770,566
Patented Nov. 13, 1956

2,770,566
METHOD OF BONDING A POLYAMIDE LAYER TO A POLYVINYL CHLORIDE LAYER AND PRODUCTS THUS OBTAINED

Franz Ritter, Grossostheim, near Aschaffenburg, Germany

Application September 24, 1952, Serial No. 311,323

Claims priority, application Germany September 29, 1951

15 Claims. (Cl. 154—139)

This invention relates to coated artificial products and more especially to laminated sheets composed of two or more superposed layers of synthetic materials of different constitution.

It is concerned, in the first place, with coated materials containing a layer of a polyamide bonded to a layer of a polyvinylester, and with the method of producing such materials.

It is well known that the polyamides heretofore prepared could be bonded to other materials, such as polyvinyl esters, only with difficulty, regardless of whether the polyamides were produced in a solution or dispersion or as a film.

This problem persisted in spite of the fact that it was recognized that if only a good bond could be obtained, these artificial materials, because of their well known excellent properties, could be used in many cases as coatings for other materials, for example, in the manufacture of artificial leather, in the coating of textiles etc.

I have discovered that I can obtain a thoroughly satisfactory bond between a polyamide layer and a polyvinyl chloride layer if I use as a binder for these materials a solution of nitrocellulose and preferably alcohol-soluble nitrocellulose, to be applied as an intermediate layer following precoating with a polyacrylic or polymethacrylic acid ester or mixed polymer. In this manner products are obtained whose surface is highly resistant to scratching and rubbing and is very elastic, and which have a very dry, smooth, leathery feel. No existing artificial material displays any similar surface feel and other surface characteristics.

Figure 1:
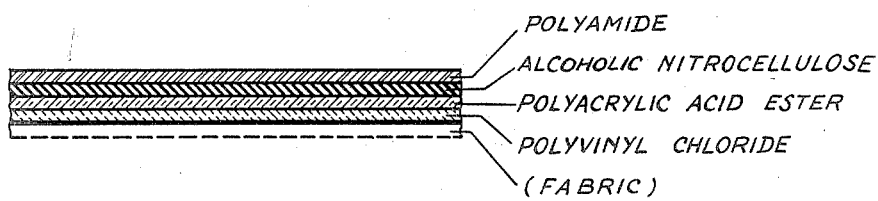
Fig. 1 is a diagrammatic sectional view of an artificial material of the present invention.
Figure 2:
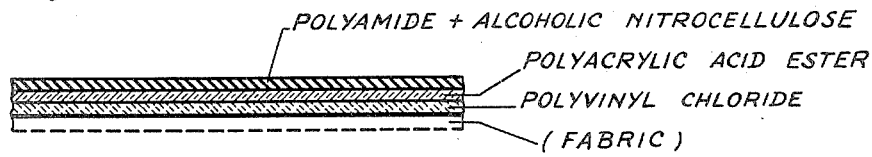
Fig. 2 is a view similar to Fig. 1 of a modified form.

In the prior art it has been proposed for purposes of making artificial leather, to first coat textile fabrics with a polyacrylic acid ester or with nitrocellulose, and to apply on this first coat a covering layer of a polyamide resin. Artificial leather thus produced, however, suffers from the disadvantages that either it has too little elasticity or even is brittle, or more important still, that the bonds between the covering layers are inadequate so the polyamide resin covering layer frequently becomes detached from the intermediate layer of polyacrylic acid ester or nitrocellulose, particularly under the influence of humidity.

The present invention eliminates these disadvantages by depositing on the textile material first a layer of a polyvinyl chloride resin, superposing on this layer by spreading or spraying a layer of an acrylic acid ester, and particularly a methacrylic acid ester or mixed polymer, and applying on the last named layer the polyamide with the addition of nitrocellulose, and preferably alcohol soluble nitrocellulose, the nitrocellulose being used either in the form of another intermediate layer or else in admixture with the polyamide.

Instead of nitrocellulose, other alcohol-soluble artificial materials such as polyvinyl acetate may be employed; nitrocellulose, however, is preferred because it yields the highest waterproofness.

The invention is illustrated by the following examples which exemplify the production of artificial leather.

EXAMPLE 1

On a fabric covered with a mixture of polyvinyl chloride and a softener as diffusion-fast as possible, and the coat on which may be colored or ornamented, there is deposited by spreading or spraying in the usual manner, as a basic coat or first intermediate protective layer a solution of:

100 grams of a polymethacrylic acid ester or mixed polymer, e.g. polymethacrylic acid methyl ester.
250 grams of ethyl acetate
50 grams of butyl acetate
30 grams of glycollic acid butyl ester
570 grams of tetrahydrofuran
—————
1000 grams On this base layer, there is spread or sprayed as a covering layer, a solution which is prepared advantageously by mixing equal parts of the following two solutions:

Solution A 200 grams of an alcohol soluble polyamide (mixed condensate)
60 grams of a sulfonamide, as softener
200 grams of methyl alcohol
390 grams of ethyl alcohol
150 grams of water
—————
1000 grams Solution B 30 grams of an alcohol soluble nitrocellulose
45 grams of a sulfonamide, as softener
550 grams of ethyl alcohol
250 grams of toluol
125 grams of methyl alcohol
—————
1000 grams For hardening purposes, a certain quantity of formaldehyde, e.g. from 3 to 5% may be added to the solution. If the solution thus prepared shall be sprayed it is preferably diluted.

In this manner, and particularly because of the use of nitrocellulose in the combination described, a particularly tight bond which in dry as well as wet condition is abrasion-fast, between the coat of polyvinyl chloride and the polyamide, is obtained.

Instead of applying the polyamide in admixture with the nitrocellulose, on a fabric coated with polyvinyl chloride, the mixture referred to also may be applied to a foil or plate of polyvinyl chloride, in the manner described above.

Instead of depositing a mixture of polyamide and nitrocellulose on the polyvinyl chloride, the nitrocellulose may also be used by itself, and inserted as an intermediate bonding layer between the polyamide and polyvinyl chloride layers, as illustrated by the following example.

EXAMPLE 2

On a fabric coated with polyvinyl chloride and a softener, for example an artificial leather made from polyvinyl chloride or on a foil or plate of polyvinyl chloride, the following solution is spread or sprayed:

100 grams of a polymethacrylic acid ester or mixed polymer, e. g. polymethacrylic acid methyl ester,
250 grams of ethyl acetate
50 grams of butyl acetate
30 grams of glycollic acid butyl ester
570 grams of tetrahydrofuran
—————
1000 grams On this base coating, the following solution is spread:

15 grams of an alcohol soluble nitrocellulose
20 grams of a sulfonamide
400 grams of ethyl acetate
100 grams of tetrahydrofuran
465 grams of ethyl alcohol
—————
1000 grams On this second coat is deposited the following solution:

100 grams of an alcohol-soluble polyamide (mixed condensate)
30 grams of a sulfonamide as softener
200 grams of methyl alcohol
550 grams of ethyl alcohol
80 grams of water
40 grams of formaldehyde
———
1000 grams This procedure also, because of the use of the acrylic acid ester and the alcohol-soluble nitrocellulose, yields a very strong bond between the polyamide and the polyvinyl chloride.

Instead of bonding the polyamides to other synthetic materials, the methods according to the invention may also be used to deposit a covering layer of polyamides, for example, on leather or other materials, such as paper and the like, or on fabrics on which a natural or synthetic substance is spread or otherwise applied as a layer. In this event, the leather, artificial leather, paper and the like, instead of an acrylic acid ester, serve as the base. Dependent on the characteristics and the intended use of the base material, other water or alcohol soluble artificial materials may be deposited for purposes of priming the base.

I have further found that the bond between the various substances and coatings is still further enhanced if the products containing polyvinyl chloride, either when finished or directly after the deposition of the acrylic acid ester, are irradiated with infra-red radiation.

I wish it to be understood that I do not desire to be limited to the exact details of methods, compounds and compositions described as numerous variations within the scope of the appended claims will be apparent to any person skilled in the art.

I claim:

1. The method of bonding a polyamide layer to a polyvinyl chloride layer which comprises depositing on the polyvinyl chloride layer a first intermediate layer of a solution of a substance selected from the group consisting of a polyacrylic acid ester and a polymethacrylic acid ester, depositing on said first intermediate layer a second intermediate layer of a substance selected from the group consisting of nitrocellulose and polyvinyl acetate, and depositing on said second intermediate layer the polyamide layer.

2. The method of bonding a polyamide layer to a polyvinyl chloride layer which comprises depositing on the polyvinyl chloride layer a first intermediate layer of a solution of a substance selected from the group consisting of a polyacrylic acid ester and a polymethacrylic acid ester, depositing on said first intermediate layer a second intermediate layer of nitrocellulose and polyvinyl acetate, and depositing on said second intermediate layer the polyamide layer.

3. The method of bonding a polyamide layer to a polyvinyl chloride layer which comprises depositing on the polyvinyl chloride layer a first intermediate layer of a solution of a substance selected from the group consisting of a polyacrylic acid ester and a polymethacrylic acid ester, depositing on said first intermediate layer a second intermediate layer of polyvinyl acetate, and depositing on said second intermediate layer the polyamide layer.

4. The method of bonding a polyamide layer to a polyvinyl chloride layer containing a softener, which comprises depositing on said material an intermediate layer of a solution of a substance selected from the group consisting of a polyacrylic acid ester and a polymethacrylic acid ester, and depositing on said intermediate layer a mixture of the polyamide and nitrocellulose.

5. The method of bonding a polyamide layer to a polyvinyl chloride layer containing a softener, which comprises depositing on said polyvinyl chloride layer a first intermediate layer of a substance selected from the group consisting of a polyacrylic acid ester and a polymethacrylic acid ester, depositing on said first intermediate layer a second intermediate layer of a solution of nitrocellulose and depositing on said second intermediate layer a solution of the polyamide.

6. The method of bonding a polyamide layer to a polyvinyl chloride layer, which comprises depositing on said polyvinyl chloride layer an intermediate layer of a substance selected from the group consisting of a polyacrylic acid ester and a polymethacrylic acid ester and depositing on said intermediate layer a mixture of alcohol-soluble nitrocellulose and the polyamide.

7. In the manufacture of artificial leather, the method which comprises coating a fabric with a mixture of polyvinyl chloride and a softener, which forms a first intermediate layer, depositing on said first intermediate layer a coating, forming a second intermediate layer, of a substance selected from the group consisting of a polyacrylic acid ester and a polymethacrylic acid ester, and depositing on the second intermediate layer a mixture of alcohol-soluble nitrocellulose and a polyamide.

8. In the manufacture of artificial leather, the method which comprises coating a fabric with a mixture of polyvinyl chloride and a softener, depositing on this coating as a first intermediate layer a substance selected from the group consisting of a polyacrylic acid ester and a polymethacrylic acid ester, depositing on this first intermediate layer a second intermediate layer of a solution of alcohol-soluble nitrocellulose, and on this second intermediate layer a solution of the polyamide.

9. The method of bonding a polyamide to polyvinyl-chloride-coated material, comprising depositing on the polyvinyl-chloride coating an intermediate layer of a substance selected from the group consisting of a polyacrylic acid ester and a polymethacrylic acid ester, depositing on said intermediate layer a mixture of alcohol-soluble nitrocellulose and a polyamide, and irradiating the product thus obtained with infra-red radiation.

10. The method of claim 9, in which the infra-red irradiation is applied after the deposition of the intermediate layer of a substance selected from the group consisting of a polyacrylic acid ester and a polymethacrylic acid ester.

11. Artificial material comprising, as a basic layer, a layer of polyvinyl chloride, on said basic layer an intermediate layer of a substance selected from the group consisting of a polyacrylic acid ester and a polymethacrylic acid ester and on said intermediate layer a layer consisting of a mixture of nitrocellulose and the polyamide.

12. Artificial material comprising, as a basic layer, a layer of polyvinyl chloride, on said basic layer a first intermediate layer of a substance selected from the group consisting of a polyacrylic acid ester and a polymethacrylic acid ester, on said first intermediate layer a second intermediate layer of nitrocellulose, and on said second intermediate layer an uppermost layer of a polyamide.

13. The method of bonding a polyamide layer to a polyvinyl chloride layer, which comprises depositing on said polyvinyl chloride layer an intermediate layer of a substance selected from the group consisting of a polyacrylic acid ester and a polymethacrylic acid ester, depositing on said intermediate layer nitrocellulose to form a second intermediate layer, and depositing the polyamide layer on the said second intermediate layer.

14. The artificial material of claim 12 in combination with a fabric bonded to the polyvinyl chloride layer of said material.

15. The artificial material of claim 11 in combination with a fabric bonded to the polyvinyl chloride layer of said material.

References Cited in the file of this patent

UNITED STATES PATENTS 2,238,694    Graves _____ Apr. 15, 1941
2,598,090    Yung et al. _____ May 27, 1952